United States Patent [19]

Messier, Jr.

[11] Patent Number: 4,578,968

[45] Date of Patent: Apr. 1, 1986

[54] FLUSH MOUNT LOCK ASSEMBLY

[75] Inventor: Roland A. Messier, Jr., Spencer, Mass.

[73] Assignee: Hudson Lock, Inc., Hudson, Mass.

[21] Appl. No.: 673,139

[22] Filed: Nov. 19, 1984

[51] Int. Cl.[4] ............................................ B60R 25/02

[52] U.S. Cl. ...................................... 70/208; 292/165; 292/DIG. 31

[58] Field of Search ................. 70/201, 207, 208, 209, 70/210; 292/139, 140, 143, 165, 167, 169, 173, 251, DIG. 31

[56] References Cited

U.S. PATENT DOCUMENTS 1,995,338 3/1935 Andrews .............................. 70/208

2,201,444 5/1940 Marsh ......................... 292/DIG. 31

3,584,483 6/1971 Orr ....................................... 70/208

*Primary Examiner*—Robert L. Wolfe

*Attorney, Agent, or Firm*—John E. Toupal; Harold G. Jarcho

[57] ABSTRACT

A flush mount latch assembly including a housing having sidewalls and endwalls that define a chamber and an open face defined by front surfaces of the side and endwalls and opening into the chamber. Pivotally mounted along a pivot axis between the sidewalls is a face plate handle that covers the open face. The face plate includes a push portion disposed on one side of the pivot axis and a pull portion disposed on an opposite side thereof. In response to pivotal movement of the face plate the push portion enters the chamber and the pull portion pivots away from the open face. Also included on the face plate is a plate surface pivotably movable within the chamber during pivotal movement of the face plate. A bolt is mounted for reciprocating linear movement within the chamber and projects through a bolt passage defined in one of the housing sidewalls. Included with the bolt is a bolt surface engaged with the plate surface during pivotal movement thereof and responsive thereto to produce the reciprocating linear movement of the bolt.

21 Claims, 5 Drawing Figures

FLUSH MOUNT LOCK ASSEMBLY

BACKGROUND OF THE INVENTION

This invention relates generally to door latches and, more particularly, to a lock controlled door latch suitable for flush mounting.

Flush mount door lock assemblies including a body, a lock bolt movably carried on the body, and an operating handle for moving the bolt relative to the body are well known. One of the design objectives in this type of door latch is to have no exposed edges to prevent the handles from being pryed open and to prevent protruding surfaces for safety purposes. Normally the handle is in a flush or nested position when the bolt is latched. Bolt unlatching is effected by moving the handle to an operating position. Locks of this type are well suited for use on swinging doors of vehicles such as trucks, on merchandise, tool and equipment cabinets, electrical equipment enclosures and the like. Prior flush mount lock assemblies have suffered from a variety of disadvantages including requirements for complex and expensive parts, difficult assembly procedures, etc.

The object of this invention, therefore, is to provide an improved flush mount lock assembly.

SUMMARY OF THE INVENTION

The invention is a flush mount latch assembly including a housing having sidewalls and endwalls that define a chamber and an open face defined by front surfaces of the side and endwalls and opening into the chamber. Pivotally mounted along a pivot axis between the sidewalls is a face plate handle that covers the open face. The face plate incudes a push portion disposed on one side of the pivot axis and a pull portion disposed on an opposite side thereof. In response to pivotal movement of the face plate the push portion enters the chamber and the pull portion pivots away from the open face. Also included on the face plate is a plate surface pivotably movable within the chamber during pivotal movement of the face plate. A bolt is mounted for reciprocating linear movement within the chamber and projects through a bolt passage defined in one of the housing sidewalls. Included with the bolt is a bolt surface engaged with the plate surface during pivotal movement thereof and responsive thereto to produce the reciprocating linear movement of the bolt. The conversion of pivotal face plate motion to reciprocating bolt motion provides a simple and efficient flush mount latch assembly.

In a preferred embodiment of the invention, the assembly includes a lock retained by the housing and having a cam mechanism engageable with a latch portion of the face plate. The lock can be employed to prevent manual operation of the face plate and thereby prevent reciprocating movement of the bolt.

According to one feature of the invention, the pull portion comprises one end of the face plate and the push portion comprises an opposite end thereof and the one end is spaced from the pivot axis of the face plate by a distance substantially greater than is the opposite end. This arrangement provides a desired mechanical advantage for operating the bolt in response to pivotal movement of the face plate.

According to another feature of the invention, the plate surface and the bolt surface comprise a helical cam surface and a cam follower engaged therewith. The engaged cam surface and cam follower are shaped and arranged to convert the pivotal movement of the face plate into the reciprocating linear movement of the bolt.

According to yet another feature of the invention, the helical cam surface comprises a helical groove and the cam follower comprises a pin disposed for movement within the helical groove. The helical groove and cam follower pin function to drive the reciprocating bolt in opposite directions, respectively, in response to opposite senses of pivotal movement by the face plate.

In a preferred embodiment, the plate surface comprises the helical cam surface and the bolt surface comprises the cam follower. This arrangement is desirable for converting the pivotal face plate movement into reciprocating bolt movement.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 4:
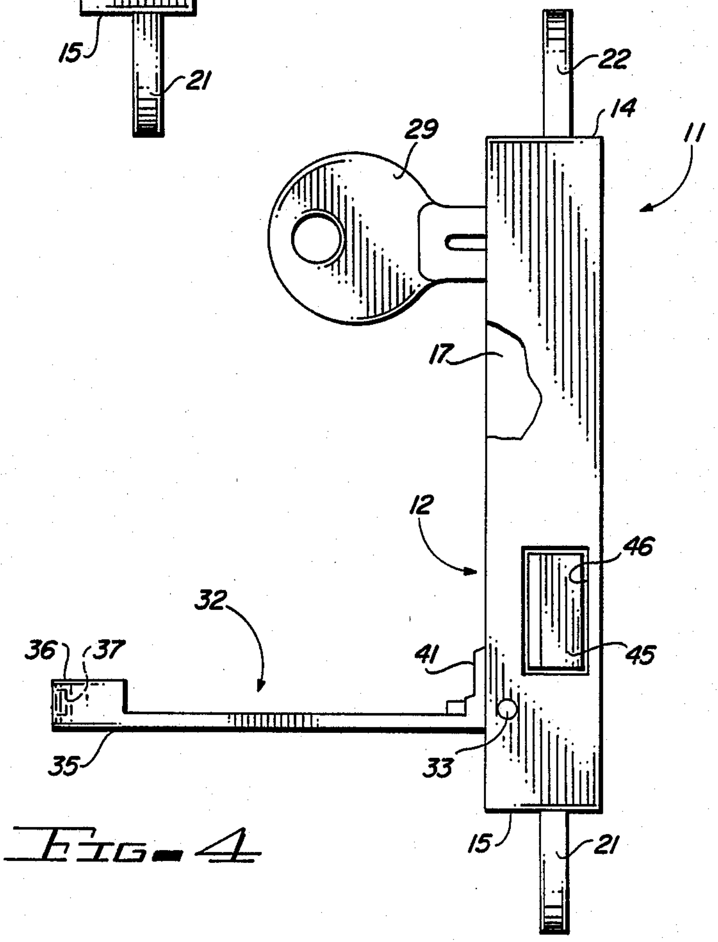
FIG. 4 is a schematic side view of the assembly corresponding to the open position shown in FIG. 3.

A lock assembly 11 includes a housing 12 having sidewalls 13, 14 and endwalls 15, 16. The sidewalls 13, 14 and endwalls 15, 16 form a chamber 17 shown in FIG. 4. Opening into the chamber 17 is an open face 18 (FIG. 3) of the housing 12 and defined by the upper surfaces of the sidewalls 13, 14 and the endwalls 15, 16. Mounting flanges 21, 22 project from midportions of, respectively, the endwalls 15, 16. Formed in the flanges 21, 22, respectively, are screw holes 23, 24 that can be employed to mount the housing 12 in a door (not shown) that provides access to a particular enclosure (not shown).

Figure 1:
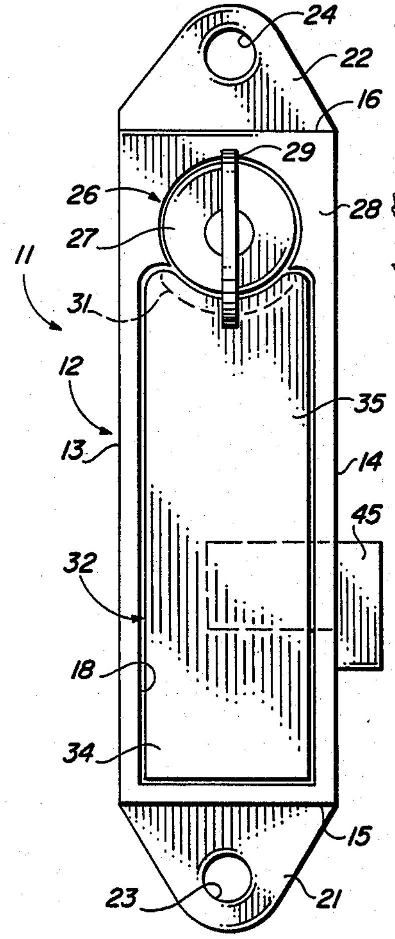
FIG. 1 is a schematic top view of a flush mount lock assembly according to the invention.

A conventional cylinder lock 26 is retained by the housing 12 and has a front face 27 flush with the top surface 28 of the endwall 16. Defined by the lock 26 and opening into the face 27 thereof is a keyway that receives a key 29. The lock 26 includes a locking cam 31 that can be rotated 180° by the key 29 between a locked position shown by solid lines in FIG. 3 and dotted lines in FIG. 1 and an open position shown by dotted lines in FIG. 3.

Figure 5:
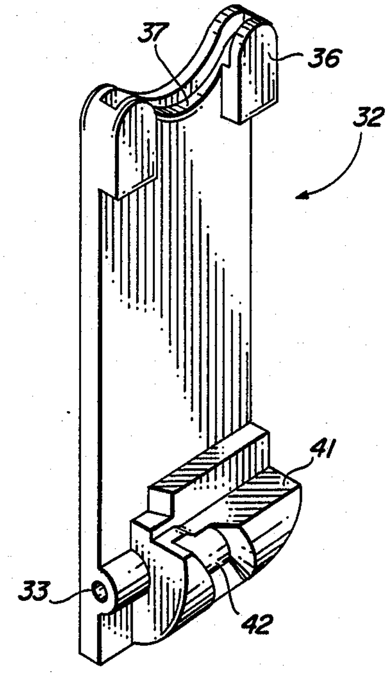
FIG. 5 is a schematic perspective view of a face plate shown in FIGS. 1–4.

A face plate 32 covers the open face 18 of the housing 12 and is flush with the top upper surfaces of the sidewalls 13, 14 and the endwalls 15, 16. Pivotally mounting the face plate 32 along a pivot axis 30 are pivot pins 33 having opposite ends received, respectively, by openings in the sidewalls 13, 14 and openings in the face plate 32. On one side of the pivot axis 30, a push portion 34 forms one end of the face plate 32 while on the other side of the axis 30, a pull portion 35 forms an opposite end of the face plate 32. Projecting into the chamber 17 from the pull portion 35 of the face plate 32 is a latch portion 36. As shown in FIG. 5 the latch portion 36 defines an arcuate slot 37 that receives the locking cam 31 in its locked position. Also projecting into the chamber 17 is a driver portion 41 of the face plate 32. The driving portion 41 is disposed directly adjacent to the pivot axis 30 and defines a helical groove cam surface 42 as shown most clearly in FIG. 5.

Mounted for reciprocating linear transverse movement in the chamber 17 is a slide bolt 45 that projects through a bolt opening 46 in the sidewall 14. Guiding that movement of the slide bolt 45 and preventing movement thereof along the longitudinal axis of the housing 12 are the driver portion 41 of the face plate 32, the sidewalls of the bolt opening 46 and a partition 47 disposed within the chamber 17 and extending between the sidewalls 13, 14. Projecting from one side of the slide bolt 45 is a cam follower pin 48 that is received by the helical groove 42 in the driver portion 41 of the face plate 32. A coil spring 51 extends between one end of the slide bolt 45 and the inner surface of the sidewall 13. The coil spring 51 biases the slide bolt 45 out of the housing chamber 17.

OPERATION

In use, the assembly 11 is flush mounted in a door providing access to a given enclosure. In a closed position, the slide bolt 45 extends into a recess within the enclosure to thereby prevent opening movement of the door. Manipulation of the face plate 32 to effect door opening is prevented with the lock 26 in the locked position shown in FIG. 1. In that position, the locking cam 31 engages the arcuate slot 37 in the latching portion 36 of the face plate 32 to prevent pivotal movement thereof about the pivot axis 30. However, 180° rotational movement of the key 29 moves the locking cam 31 into the open position shown by dotted lines in FIG. 3 and out of engagement with the latching portion 36.

Figure 3:
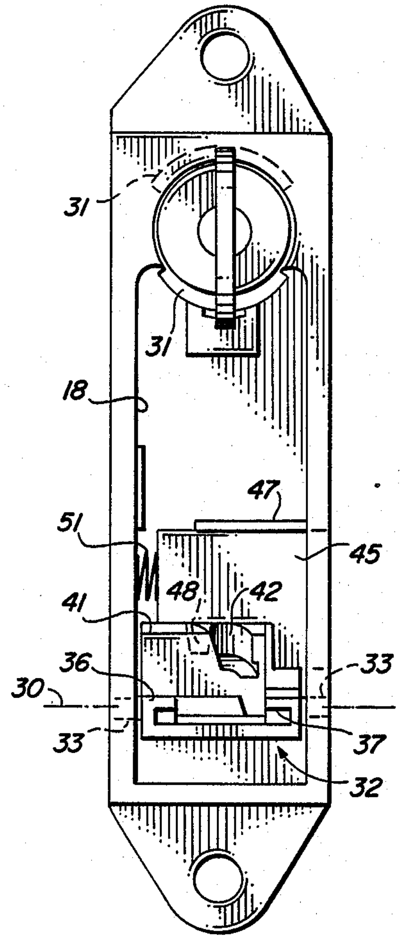
FIG. 3 is a schematic top view of the assembly shown in FIGS. 1 and 2 with the lock in an open position.

Exertion of inward pressure on the push portion 34 initiates pivotal movement of the face plate 32 about the pivot axis 30 with the push portion 34 moving into the chamber 17 and the pull portion 35 moving away therefrom. The end of the face plate 32 forming the pull portion 35 then can be grasped and pulled to move the face plate 32 into the fully opened position shown in FIGS. 3 and 4. During this pivotal movement of the face plate 32, the helical cam surface of the driving portion 41 undergoes similar pivotal movement within the chamber 17. In response to that movement of the driving portion, the trapped cam follower pin 48 is moved along a linear path that draws the slide bolt 45 within the chamber 17 as shown in FIG. 3. The door retaining the lock assembly 11 then can be opened to provided access to its enclosure.

Figure 2:
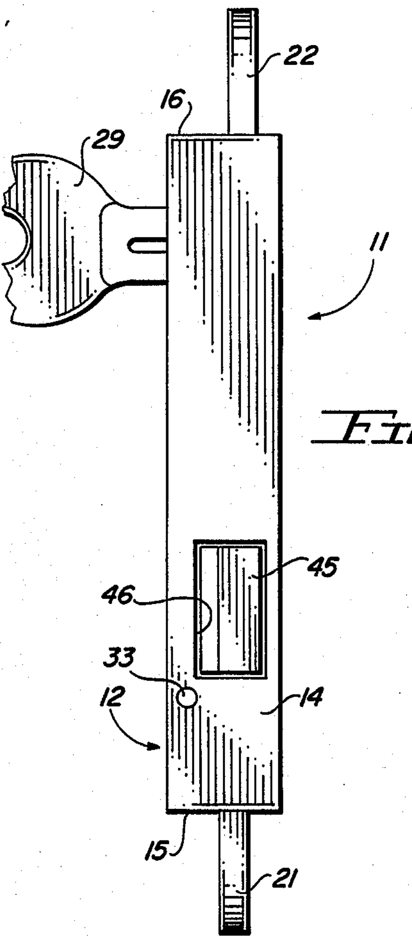
FIG. 2 is a schematic side view of the assembly shown in FIG. 1.

Upon release of the face plate 32, the coil spring 51 exerts a force that forces the slide bolt 45 out of the bolt passage 46 while also inducing pivotal movement of the engaged helical groove 42 and the driving portion 41. This motion again moves the face plate 32 into the closed position shown in FIGS. 1 and 2. However, in the absence of a spring 51, return of the components to the closed positions shown in FIGS. 1 and 2 can be accomplished by manually pivoting the face plate 32 from the open position shown in FIGS. 3 and 4 to the closed position shown in FIGS. 1 and 2. During that pivotal movement, the helical cam groove 42 moves the cam follower pin 48 and the bolt 45 in a linear direction opposite to that produced by opening pivotal movement of the face plate 32.

Obviously, many modifications and variations of the present invention are possible in light of the above teachings. It is to be understood, therefore, that the invention can be practiced otherwise than as specifically described.

What is claimed is:

1. A flush mount lock assembly comprising:
a housing means defining a chamber and an open face opening into said chamber;
a face plate means pivotally mounted along a pivot axis and covering said open face, said face plate means comprising a push portion disposed on one side of said pivot axis and a pull portion disposed on an opposite side thereof and wherein said push portion enters said chamber and said pull portion pivots away from said open face during pivotal movement of said face plate means, said face plate means further comprising a plate surface pivotally movable within said chamber during said pivotal movement of said face plate means; and
a bolt means mounted for linear movement within said chamber in a direction substantially parallel to said pivot axis, said bolt means comprising a bolt surface engaged with said plate surface during said pivotal movement thereof and wherein said engaged bolt surface and said plate surface are shaped and arranged to produce said linear movement of said bolt means in response to said pivotal movement of said face plate means.

2. A lock assembly according to claim 1 wherein said housing means comprises sidewalls and endwalls that define said chamber, said open face is defined by front surfaces of said sidewalls and said endwalls, and said pivot axis is directed between said sidewalls, and said bolt means projects through a bolt passage defined in one of said endwalls.

3. A lock assembly according to claim 2 wherein said face plate means further comprises a latch portion projecting into said chamber, and including a lock means retained by said housing and having a cam means engageable with said latch portion when in a locked position and disengaged therefrom when in an unlocked position.

4. A lock assembly according to claim 3 wherein said lock means has a keyway defining face retained by and flush with said front surface of one of said end walls.

5. A lock assembly according to claim 4 wherein said latch portion projects from said pull portion of said face plate means.

6. A lock assembly according to claim 5 wherein said push portion comprises one end of said push plate means and said pull portion comprises an opposite end thereof, and wherein said opposite end is spaced from said pivot axis by a distance substantially greater than is said one end.

7. A lock assembly according to claim 6 wherein said plate surface and said bolt surface are located between said pivot axis and said pull portion.

8. A lock assembly according to claim 7 wherein said plate surface and said bolt surface are closely adjacent to said pivot axis, and including bias means urging said bolt means out of said chamber.

9. A lock assembly according to claim 2 wherein said plate surface and said bolt surface comprise a helical cam surface and a cam follower engaged therewith, said engaged cam surface and said cam follower being shaped and arranged to convert said pivotal movement of said face plate means into said linear movement of said bolt means.

10. A lock assembly according to claim 9 wherein said face plate means further comprises a latch portion projecting into said chamber, and including a lock means retained by said housing and having a cam means engageable with said latch portion when in a locked position and disengaged therefrom when in an unlocked position.

11. A lock assembly according to claim 10 wherein said lock means has a keyway defining face retained by and flush with said front surface of one of said end walls.

12. A lock assembly according to claim 11 wherein said latch portion projects from said pull portion of said face plate means.

13. A lock assembly according to claim 12 wherein said push portion comprises one end of said push plate means and said pull portion comprises an opposite end thereof, and wherein said opposite end is spaced from said pivot axis by a distance substantially greater than is said one end.

14. A lock assembly according to claim 13 wherein said plate surface and said bolt surface are located between said pivot axis and said pull portion.

15. A lock assembly according to claim 14 wherein said plate surface and said bolt surface are closely adjacent to said pivot axis, and including bias means urging said bolt means out of said chamber.

16. A lock assembly according to claim 9 wherein said helical cam surface comprises a helical groove and said cam follower comprises a pin disposed for movement within said helical groove so as to produce reciprocating linear movement of said bolt means in response to reciprocating pivotal movement of said face plate means.

17. A lock assembly according to claim 9 wherein said plate surface comprises said helical cam surface and said bolt surface comprises said cam follower.

18. A lock assembly according to claim 17 wherein said helical cam surface comprises a helical groove and said cam follower comprises a pin disposed for movement within said helical groove so as to produce reciprocating linear movement of said bolt means in response to reciprocating pivotal movement of said face plate means.

19. A lock assembly according to claim 18 wherein said face plate means further comprises a latch portion projecting into said chamber, and including a lock means retained by said housing and having a cam means engageable with said latch portion when in a locked position and disengaged therefrom when in an unlocked position.

20. A lock assembly according to claim 19 wherein said latch portion projects from said pull portion of said face plate means.

21. A lock assembly according to claim 20 wherein said push portion comprises one end of said push plate means and said pull portion comprises an opposite end thereof, and wherein said opposite end is spaced from said pivot axis by a distance substantially greater than is said one end.

* * * * *